(12) United States Patent
Kobayashi et al.

(10) Patent No.: US 6,721,266 B1
(45) Date of Patent: *Apr. 13, 2004

(54) DISC CARTRIDGE WITH SLIDABLY MOUNTED SHUTTER

(75) Inventors: Shinkichi Kobayashi, Shizuoka (JP); Yoshio Saeki, Shizuoka (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1053 days.

(21) Appl. No.: 08/741,226

(22) Filed: Oct. 29, 1996

Related U.S. Application Data

(63) Continuation of application No. 08/339,919, filed on Nov. 15, 1994, now abandoned, which is a continuation of application No. 08/094,554, filed on Jul. 20, 1993, now abandoned.

(30) Foreign Application Priority Data

Jul. 23, 1992 (JP) .......................................... P04-216620

(51) Int. Cl.[7] ............................................. G11B 23/03
(52) U.S. Cl. ...................................... 369/291; 360/133
(58) Field of Search ......................... 369/291; 360/133, 360/132

(56) References Cited

U.S. PATENT DOCUMENTS

| | | | |
|---|---|---|---|
| 4,694,448 A | * | 9/1987 | Tamaru et al. ............... 369/291 |
| 4,714,973 A | | 12/1987 | Kato et al. ................... 360/133 |
| 5,051,857 A | * | 9/1991 | Akiyama ..................... 360/133 |
| 5,121,277 A | | 6/1992 | Ikebe et al. .................. 360/133 |
| 5,189,586 A | | 2/1993 | Rumpza et al. ............. 360/133 |

FOREIGN PATENT DOCUMENTS

| | | |
|---|---|---|
| EP | 0 277 809 A1 | 8/1988 |
| EP | 0 295 025 A1 | 12/1988 |
| EP | 0 472 443 A1 | 2/1992 |
| EP | 0 494 794 A3 | 7/1992 |
| EP | 0 526 222 A2 | 2/1993 |
| JP | 61-255570 | 11/1986 |
| JP | 4-34784 | * 2/1992 |

OTHER PUBLICATIONS

Patent Abstracts of Japan, vol. 011, No. 107 (P–563), Apr. 4, 1987 & JP–A–61 255 570 (Hitachi Maxell), Nov. 13, 1986.

* cited by examiner

*Primary Examiner*—William Korzuch
(74) *Attorney, Agent, or Firm*—Sonnenschein, Nath & Rosenthal LLP

(57) ABSTRACT

A disc cartridge includes a first half, a second half, and a shutter member. The second half is connected to the first half. The second half is formed with a first aperture facing an optical head and a second aperture via which a disc rotational driving device is introduced. The shutter member is slidably mounted on the second half and has a first plate portion, at least one second plate portion and a connecting portion. The first plate portion opens or closes the first aperture and contacts the outer surface of the second half. At least one second plate portion extends parallel to the first plate portion for engaging with the inner surface of the second half. The connecting portion interconnects the first and second plate portions to complete the cross-sectional shape of a letter U of the shutter member. The length of the second plate portion is less than the length of the first plate portion.

2 Claims, 5 Drawing Sheets

DISC CARTRIDGE WITH SLIDABLY MOUNTED SHUTTER

This is a divisional application continuation-in-part of co-pending application Ser. No. 08/339,919 filed on Nov. 15, 1994 now abandoned, which is a continuation of Appln. Ser. No. 08/094,554 filed on Jul. 20, 1993 now abandoned.

BACKGROUND

1. Field of the Invention

The present invention relates to a disc cartridge. More particularly, the present invention relates to a disc cartridge in which an optical disc is rotatable within in a cartridge main body.

2. Background of the Invention

In general, a disc cartridge has a cartridge main body and a shutter member. The cartridge main body is formed by abutting and interconnecting first and second halves. Information signals recorded on an optical disc rotatable within the cartridge main body of the disc cartridge may be read using an optical head provided within a reproducing apparatus. To this end, the disc cartridge containing the optical disc therein has a signal readout exposing the optical disc to the optical head.

With such a disc cartridge, should the aperture be left open, the optical disc contained within the cartridge main body remains partially exposed to outside. Consequently, it is not possible to prevent deposition of dust and dirt on the optical disc with could result in damage to the optical disc.

Thus, a disc cartridge with a signal readout aperture is provided with a shutter member for closing the aperture when the disc cartridge is not loaded on the reproducing apparatus, such as during storage. The shutter member is supported for movement along the outer lateral side of the cartridge main body. The shutter member is formed by bending a metallic plate of a reduced thickness by a metallic mold. The shutter member includes a plate section for closing the aperture in the disc cartridge and a web section which acts as a slide guide. The web section is provided at the proximal side of the plate section and has an engaging part engaged with a groove formed in a lateral side of the cartridge main body.

The plate section is rectangularly-shaped and is of a size sufficient to close the aperture and is movable along the outer lateral surface of the half of the cartridge having the aperture. The web section extends along the lateral side of the cartridge main body and has an engaging part engaged to the groove formed in the lateral side of the cartridge main body.

A disc cartridge with a shutter member associated with only one of the cartridge halves, such the disc cartridge as described in, for example, JP Patent KOKAI Publication No. 61-255570 (1986), has been proposed. With this disc cartridge, the plate section is provided to a pawl engaged with a groove formed in the outer lateral side of the cartridge main body for preventing the shutter member from becoming detached from the plate section. The pawl is provided obliquely at a certain predetermined angle with respect to the plate section for assuring reliable prevention of detachment of the shutter member from the cartridge main body.

However, with a pawl formed obliquely with in respect to the plate section, the metallic mold used for fabricating the shutter member becomes complex to manufacture. Above all, should burrs be produced at the distal end of the pawl, the cartridge halves tend to be scraped by these burrs during movement of the shutter member.

SUMMARY OF THE INVENTION

It is an object of the present invention to provide a disc cartridge which resolves the above-mentioned problems.

It is another object of the present invention to provide a disc cartridge to which a shutter member is reliably attached.

According to the present invention, there is provided a disc cartridge including a first half, a second half, and a shutter member. The second half is connected to the first half. The second half is formed with a first aperture facing an optical head and a second aperture via which a rotational disc driving device is introduced. The shutter member is slidably mounted on the second half and has a first plate portion, at least one second plate portion and a connecting portion. The first plate portion opens or closes the first aperture and is in contact with the outer surface of the second half. At least one second plate portion extends parallel to the first plate portion and is engaged with the inner surface of the second half. The connecting portion interconnects the first and second plate portions to complete the cross-sectional shape of a letter U of the shutter member. The length of the second plate portion is less than the length of the first plate portion.

According to the present invention, the shutter member may be reliably mounted on the cartridge main body to realize its stable movement.

BRIEF DESCRIPTION OF THE DRAWINGS

The invention will be more readily understood with reference to the accompanying drawing, wherein.

DESCRIPTION OF THE INVENTION

Figure 1:
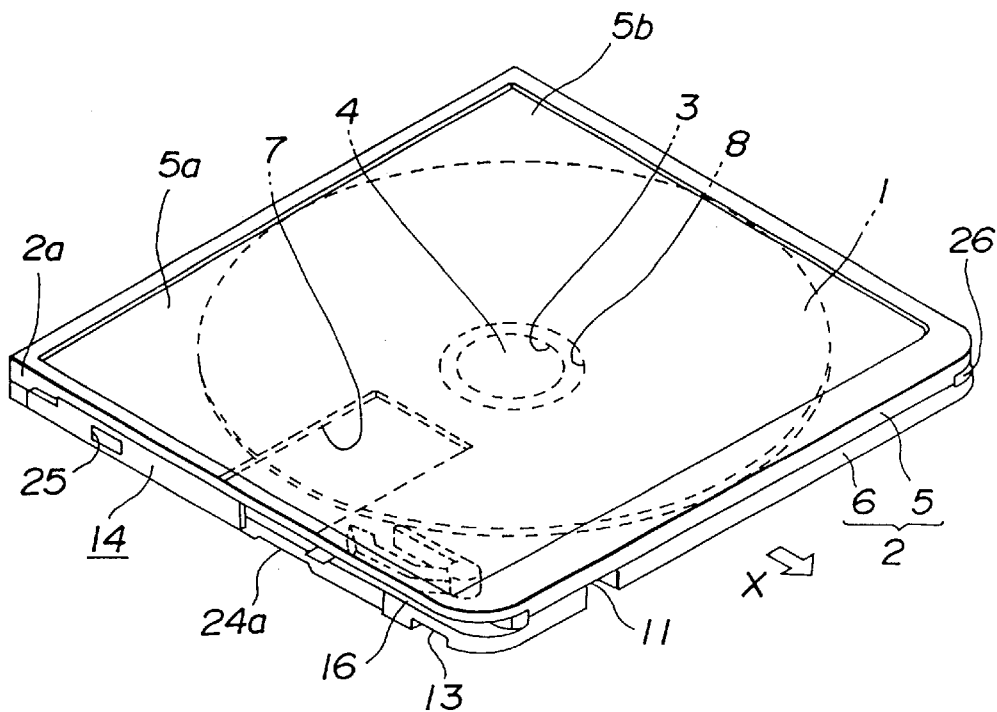
FIG. 1 is a perspective view of a disc cartridge according to the prevent invention, as viewed from the upper half side.
Figure 2:
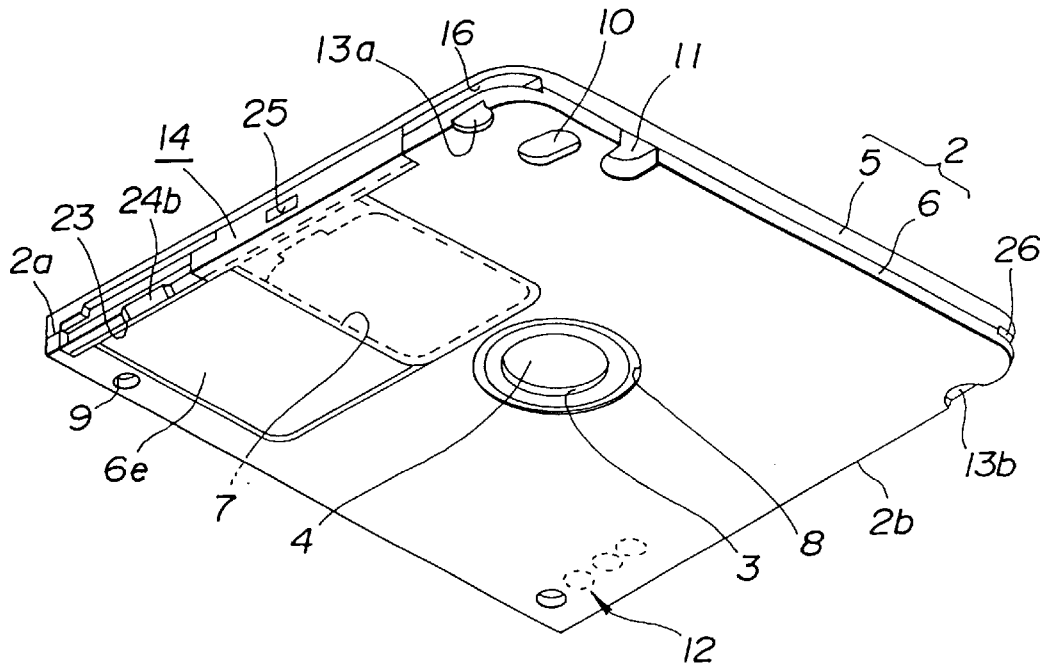
FIG. 2 is a perspective view of the disc cartridge shown in FIG. 1, as viewed from the lower half side.
Figure 3:
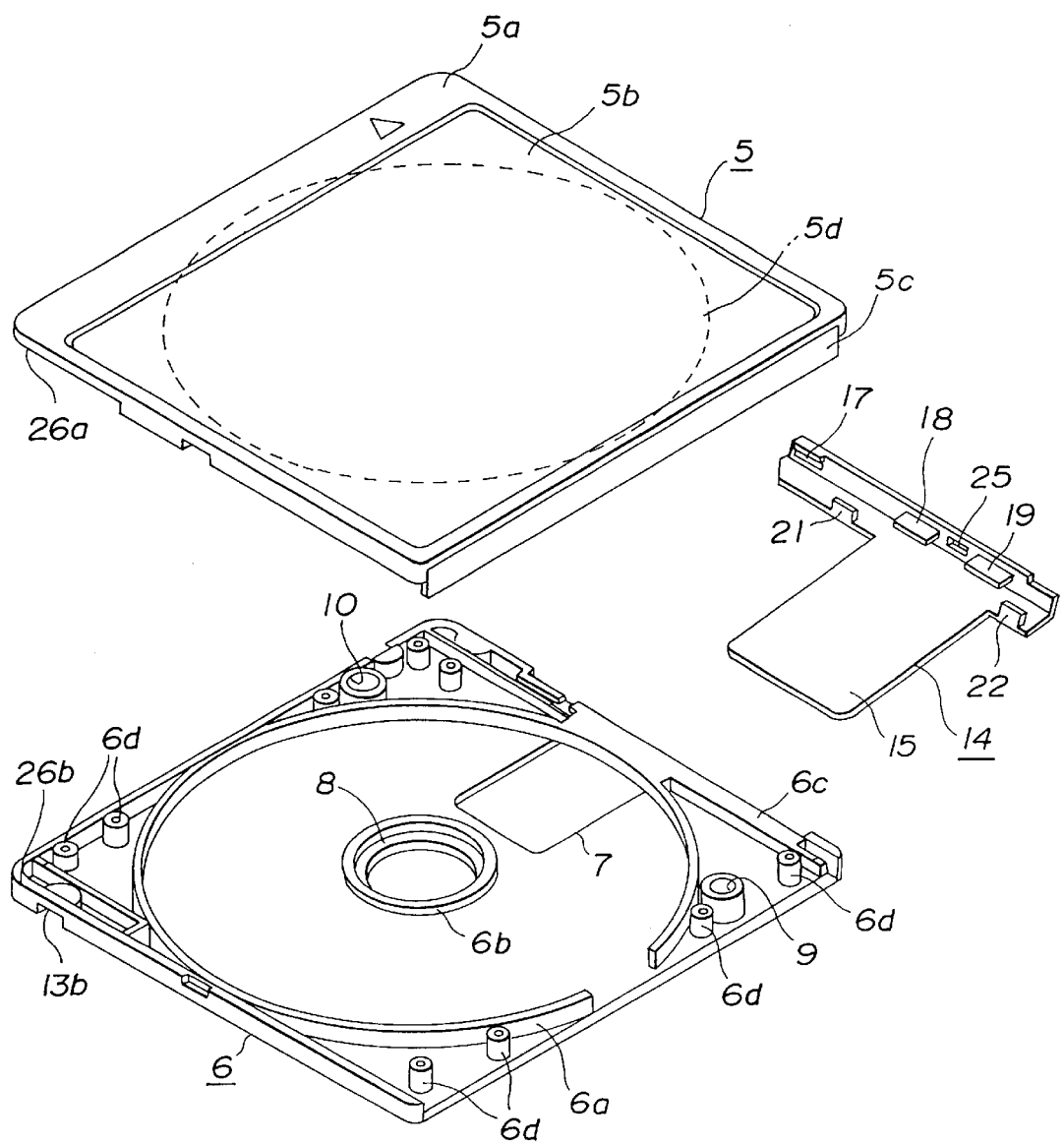
FIG. 3 is an exploded perspective view of the disc cartridge shown in FIG. 1.
Figure 4:
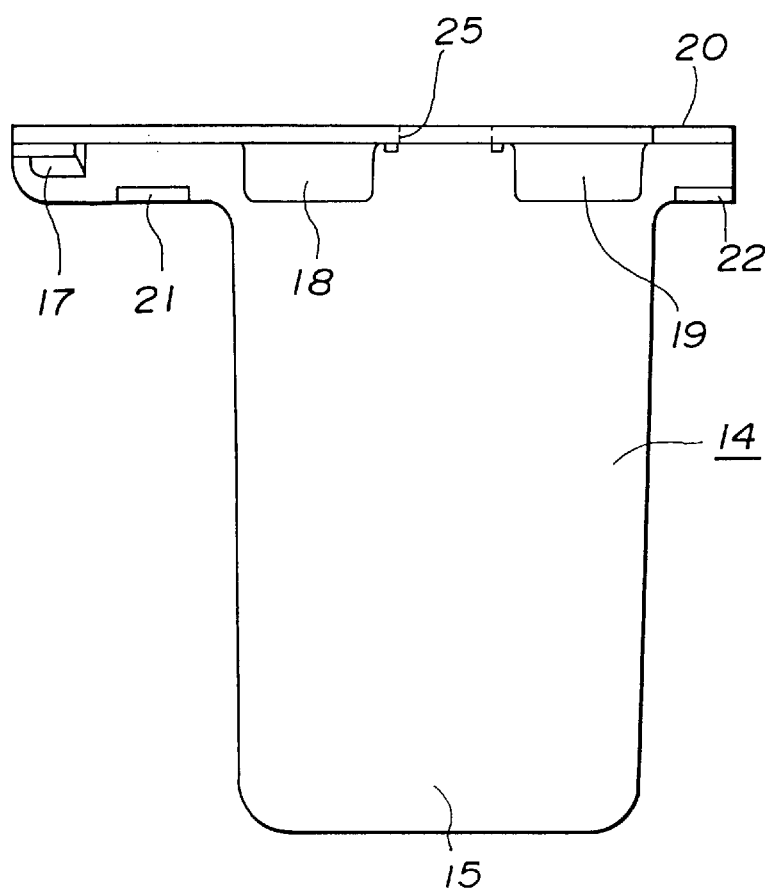
FIG. 4 is an enlarged front view showing a shutter member.
Figure 5:
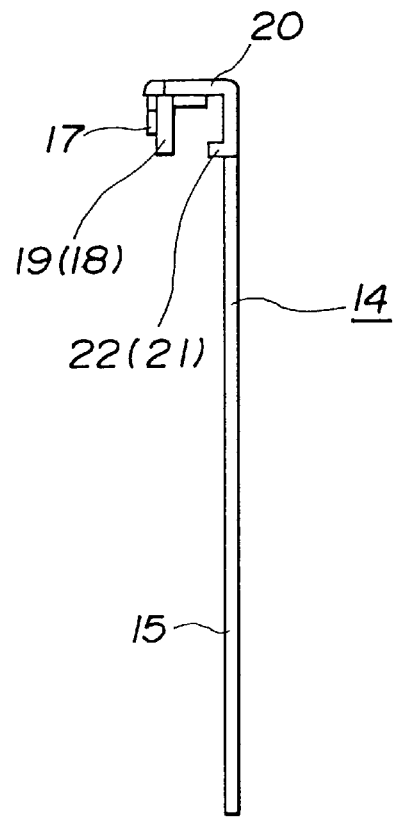
FIG. 5 is an enlarged cross-sectional view of the shutter shown in FIG. 4.
Figure 6:
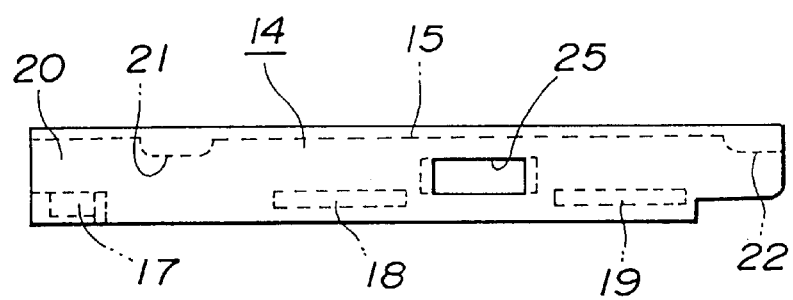
FIG. 6 is an enlarged plan view of the shutter shown in FIG. 4.

Referring to FIGS. 1, 2 and 3, a disc cartridge according to the present invention includes a cartridge main body 2 containing a rotatable optical disc 1, and a shutter member 14. The optical disc 1 includes a disc substrate, a recording layer and a protective layer. The disc substrate is formed as a disk from a transparent synthetic resin, such as polycarbonate. The recording layer is formed of a metallic material, such as aluminum, deposited on one of the major surfaces of the disc substrate. A pattern of micro-irregularities, corresponding to information signals, are formed on the aforementioned major surface of the disc substrate. The information signals, recorded in the form of the micro-irregularities as pits, may be read by radiating a laser beam to the pattern of the micro-irregularities from the opposite major surface of the disc substrate and detecting the intensity of the laser beam reflected back from the pattern. The protective layer of a UV curable resin is formed on the- recording layer for protecting the recording layer. In the present embodiment, an optical disc having a diameter of 64 mm and carrying approximately 72 minutes of musical signals thereon is employed as the optical disc 1.

The central portion of the optical disc 1 is formed with a clamping section adapted for being clamped by a disc rotational driving device provided in the reproducing apparatus. The clamping section has a circular centering opening 3 formed at the center of the disc substrate and a clamping plate 4 formed by a disk-shaped metallic plate for closing the centering opening 3.

The cartridge main body 2 is made up of an upper half 5 and a lower half 6 in the form of rectangle/abutted to each other to constitute a thin casing dimensioned for containing the rotatable optical disc 1 therein. The upper and lower halves 5, 6 are formed of synthetic resin.

Since the disc cartridge of the illustrated embodiment is used exclusively for replay, the upper half 5 is not provided with an aperture for exposing the major surface of the optical disc 1 having the signal recording layer to outside. Instead, a recess 5a for printing or bonding a label or the like thereto is formed in the major surface 5a of the upper half 5. The upper half 5 has its lateral side 5c higher in height than its remaining lateral sides. The lateral side 5c is a region for bonding a label or the like thereto. The portion of the lower half 6 connected to the lateral side 5c is not formed with a corresponding lateral side. That is, the lateral side 5c is formed with a thickness equal to that of the cartridge main body 2.

The inner surface of the upper half 5 is formed to engage with an annular rib 6a of the lower half 6 as later described, and an engaging section, not shown, for engaging with a boss 6d of the lower half 6. One of the lateral sides of the upper half 5 is formed with a stepped part 26a defining a mistaken insertion inhibiting slot 26 as later described. The end face of the annular rib 5d is caused to bear on the end face of the annular rib 6a of the lower half 6. Thus the annular rib 5d defines a housing space for the optical disc 1 in cooperation with the annular rib 6a.

The lower half 6 is formed with a first aperture 7 facing the optical head of the reproducing apparatus and a second aperture 8 via which the disc rotational driving device of the reproducing apparatus is to be introduced. The first aperture 7 is formed substantially as a rectangle extending from the center of the lower half 6 towards the lateral side of the lower half 6. The second aperture 8 is formed as a circular opening at the center of the lower half 6.

The second aperture 8 is a circular opening of a size large enough to expose the center opening 3 and the clamping plate 4 of the optical disc 1 contained in the cartridge main body 2. The second aperture 8 is faced by the disc rotational driving device adapted for magnetically attracting the clamping plate 4 of the optical disc 1 contained in the optical disc 1 for rotational driving the optical disc. An annular protrusion 6b is formed for extending along the rim of the second aperture 8. When the disc cartridge is not in use, the annular protrusion 6b supports the outer rim of the central opening 3 of the optical disc 1. An annular rib 6a, an upstanding wall section 6c and a plurality of bosses 6d protrude from the inner surface of the lower half 6. The annular rib 6a defines the space for accommodating the optical disc 1 in cooperation with the annular rib 5a of the upper half 5, as described above. The upstanding wall 6c is formed extending along one of the lateral sides of the lower half 6. It is on this upstanding wall 6c that engaging sections 18, 19 of the shutter member 14 as later described are slid. The bosses 6d are engaged with mating engaging sections of the upper half 5. The upper and lower halves 5 and 6 are ultrasonically welded to each other with the bosses 6d engaging with the mating engaging section of the upper half 5. The lower half 6 is surrounded on three sides by wall sections and open on one side, as shown in FIG. 3. The lateral side 5c of the upper half 5 is caused to bear on this open side. The stepped portion 26b defining the mistaken insertion inhibiting slot 26, as later explained, is formed in one of the lateral sides of the lower half 6. The inner surface of the upper half 5 and the upstanding wall section 6c of the lower half 6 delimit a guide groove 16 as will be explained later.

The outer surface of the lower half 6 is formed with a recess 6e of a depth substantially equal to the thickness of the plate section 15 of the shutter member 14 and a groove 23 engaged by lugs 21, 22 of the shutter 14. The recess 6e is formed in the outer surface of the lower half 6 over a range of movement of the shutter member 14. The groove 23 extends along one of the lateral sides of the lower half 6. The lower half 6 is formed with two tapered portions 24a, 24b between the groove 23 and the outer edge of the lower half 6, as shown in FIGS. 1 and 2. These tapered portions 24a, 24b are inclined surfaces inclined towards the groove 23 and the outer edge of the lower half 6. The distance between these tapered portions 24a, 24b along the lateral side of the cartridge is approximately equal to the distance between the lugs 21 and 22 of the shutter member 14, while the width of each of the tapered sections 24a, 24b is wider than the width of each of the lugs 21, 22.

The lower half 6 is provided with two positioning holes 9, 10 for positioning the disc cartridge with respect to the reproducing apparatus. These positioning holes 9, 10 are provided along a straight line extending from the upstream side towards the downstream side in the direction of insertion of the disc cartridge. The direction of insertion is shown by an arrow "X" in FIG. 1. The positioning holes 9 and 10 are elliptical and circular in profile, respectively. The reproducing apparatus is provided with positioning pins, not shown, having conical distal ends for loading the disc cartridge in position on the reproducing apparatus.

The lower half 6 is also provided with an adjustment recess 11 for controlling the height of a magnetic head enclosed within a recording and/or reproducing apparatus in order to permit the disc, cartridge to be reproduced by the recording and/or reproducing apparatus. The adjustment recess 11 is formed as a circular recess by partially removing the inserting lateral side of the disc cartridge.

The lower half 6 is also provided with a plurality of recording medium discriminating holes 12 for discriminating the types of the optical discs 1 contained within the cartridge main body 2. These discriminating holes 12 are provided as small circular openings on a straight line at a corner of the lower half 6 at the downstream side relative to the inserting direction X of the disc cartridge into the reproducing apparatus.

The lower half 6 is also provided with cutouts 13a, 13b which may be used for securing the disc cartridge within a storage rack or as engagement sections when taking out the disc cartridge by an automatic exchanging apparatus (so-called auto-changer). These cutouts 13a, 13b are provided at the lateral side 2a provided with the shutter 14 and at the opposite lateral side 2b of the cartridge main body 2. That is, these cutouts 13a, 13b are formed as arcuate recesses at the position proximate to the inserting lateral side of the disc cartridge by partially removing the lateral side 2a and the opposite lateral side 2b of the cartridge main body 2.

The lower half 6 is also formed with a mistaken insertion inhibiting groove 26 for preventing mistaken insertion of the disc cartridge into the reproducing apparatus. This groove 26 is formed from the front side up to an intermediate portion in the lateral side 2b opposite to the lateral side 2a of the cartridge main body 2 provided with a guide groove 16 as later explained. In other words, the mistaken insertion inhibiting groove 26 is shorter in length than the guide groove 16. Should the disc cartridge be inserted in a mistaken condition, such as upside down into the reproducing apparatus, the shutter opening member of the reproducing apparatus is engaged with the mistaken insertion inhibiting groove 26. Since the shutter opening member is caused, in such case, to bear on the terminal end of the mistaken insertion inhibiting groove 26, the disc cartridge cannot be introduced further to prevent mistaken insertion of the disc cartridge.

The shutter member 14 for opening and closing the first aperture 7 is mounted on the lower half 6 for movement along the outer lateral side 6a thereof. The shutter member 14 is molded integrally of synthetic resin such as by injection molding. As shown in FIGS. 3 to 6, the shutter member 14 is made up of a plate section 15 for opening and closing the first aperture 7, engaging sections 17, 18 and 19 formed in the lateral side 2a of the cartridge main body 2 for engaging with the guide groove 16 and a connecting section which is contiguous to the plate section 15 and on which the engaging sections 17 to 19 are formed. The engaging sections 17 to 19 and the plate section 15 are interconnected by the connecting section 20 in the form of a letter U.

The plate section 15 includes a rectangular portion of a size at least large enough to cover the first aperture 7. The plate section is has its proximal side contiguous to the connecting section 20 extended along the sliding direction of the shutter member so that the plate section in its entirety has the shape of a letter T. The arm sections of the letter T are formed with the lugs 21, 22 for preventing the shutter member 14 from being disengaged from the lower half 6. These lugs 21, 22 are formed on the arm sections on both sides of the rectangular portion of the plate section for extending at right angles to the plate section 15. These lugs 21, 22 engage in the groove 23 formed in the outer lateral side 6a of the lower half 6 for extending in the sliding direction of the shutter member 14. The groove 23 is formed adjacent the guide groove 16 in the lower half 6 at a position facing the lugs 21, 22 for extending at right angles to the surface of the lower half 6.

The engaging sections 17 to 19 are adapted for supporting the shutter member 14 for movement relative to the lower half 6 and are formed for facing the guide groove 16 formed in the lateral side 2a of the cartridge main body 2. The engaging sections 17 to 19 are provided at the mid part and towards both ends of the connecting section 20 as tongues extending down from the side edge of the web section 20 into the guide groove 16. These engaging sections 17 to 19 are slid against the upstanding wall section 6c of the lower half 6, as shown in FIG. 7.

The connecting section 20 plays the role of interconnecting the plate section 15 and the engaging sections 17 to 19, and is extended parallel to the lateral side 2a of the cartridge main body 2. The connecting section 20 is provided with an operating opening 25 engaged by a shutter closure member provided on the reproducing apparatus for closing the shutter member 14. The operating opening 25 is formed as a rectangular opening at a mid portion of the connecting section 20.

The upper and lower halves 5, 6 are assembled together to form the cartridge main body and the shutter member 14 is mounted on the resulting cartridge main body 2 in the following manner. The optical disc 1 is placed in the region defined by the annular rib 6a of the lower half 6 and the upper half 5 is placed in register on the cartridge half 6 and welded thereto by a welding method such as ultrasonic welding. The cartridge main body 2, completed in this manner, has the guide groove 16 in its lateral side 2a and the mistaken insertion inhibiting groove 26 on its lateral side opposite and parallel to the lateral side 2a.

Figure 7:
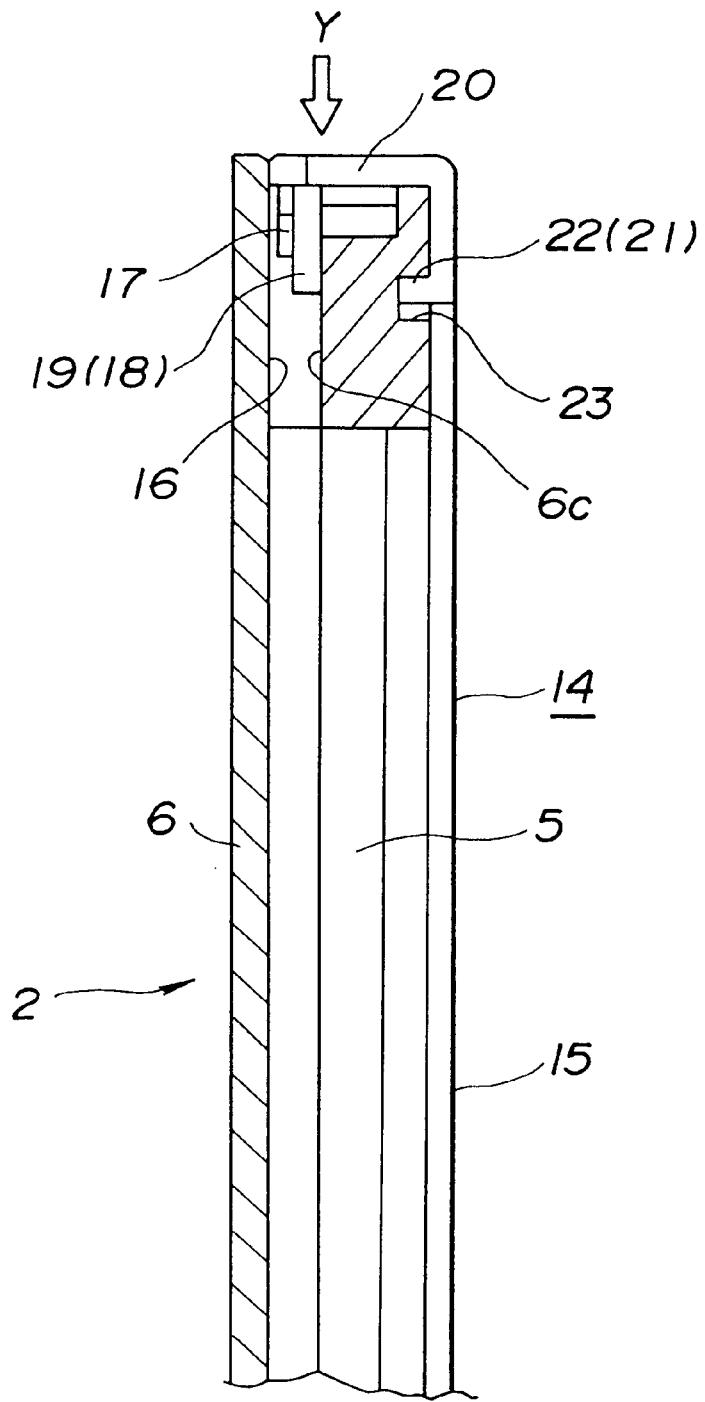
FIG. 7 is an enlarged side view showing the shutter member mounted on the cartridge main body, with portions being broken away.

The shutter member 14 is thrust in this state into the cartridge main body 2 as shown by an arrow Y in FIG. 7, so that the engaging sections 17 to 19 of the shutter member 14 are intruded into the guide groove 16 and the lugs 21, 22 are in register with the taper sections 24a and 24b of the lower half 6. The result is that the lugs 21, 22 are moved to follow the tilt of the taper sections 24a, 24b to cause resilient flexure of the shutter 14 member, with the lugs 21, 22 then riding over the taper sections 24a, 24b into engagement with the groove 23. In this manner, the shutter member 14 is mounted on the cartridge main body 2 for movement along the lateral side 2a of the cartridge main body 2.

That is, the shutter member 14 is mounted for movement relative to the cartridge main body 2, by having its engaging sections 17 to 19 engaged in the guide groove 16 formed in the lateral side 2a of the cartridge main body 2 and by having its lugs 21, 22 engaged in the groove 23 formed in the outer lateral side 6a of the lower half 6, as shown in FIG. 7. The shutter member 14 is moved between a position of opening the first aperture 7 of the cartridge main body 2 shown in FIG. 1 and a position of closing the aperture 7.

Since the lugs 21, 22 extend at right angles to the plate section 15, they are engaged positively in the groove 23 to prevent the shutter member 14 from being disengaged from the cartridge main body 2. Since the groove 23 extends at right angles to the outer lateral side 6a of the lower half 6, smooth movement of the shutter member 14 is assured. The shutter member 14 is formed of synthetic resin so that there is no risk of the lugs 21, 22 being caught by the groove 23 during sliding of the shutter member 14 to scrape off the material from around the groove 23. The lugs 21, 22 extend at right angles to the plate section 15 and are thus located in a manner free from obstructive objects when seen in plan to facilitate the preparation of a metallic mold used for producing the shutter member 14. The shutter member 14 is cast integrally from the resin material and hence exhibits resiliency so that it may be mounted easily on the cartridge main body 2 simply by being thrust in a direction shown by arrow Y in FIG. 7.

Although the foregoing description has been made of the disc cartridge including the read-only optical disc 1 contained in the cartridge main body 2, the present invention may similarly be applied with comparable operation and results to a disc cartridge containing a magneto-optical disc.

What is claimed is:

1. A disc cartridge for enclosing an optical disc comprising:
   (a) a cartridge body having (1) a first and second halves and for accommodating said optical disc in which said optical disc has a diameter of approximately 64 mm, (2) a first guide groove formed in a lateral side of said cartridge body, said first half having a generally rectangular shape, (3) a first opening for inserting a disc rotational driving means, a second opening to allow passage of a light beam to said optical disc, and (4) a second guide groove formed along one side of said first half, said second half formed in a generally rectangular shape and having a flat outer surface on which a label may be affixed and without an opening, and said second half being connected to said first half thereby defining a space to accommodate said optical disc;

(b) a shutter member molded integrally of synthetic resin and mounted on only said first half of said cartridge body for opening and closing said second opening of the first half, and wherein said shutter member being moveable along said first and second guide grooves, said shutter member having a continuous plate portion having a substantially T-shape with two arms for opening and closing said second opening of the first half and engaging portions formed parallel to the continuous plate portion and engaging with the first guide groove formed in the lateral side of the cartridge body for holding said shutter member to the lateral side of said cartridge body;

(c) a connecting portion interconnecting the continuous plate portion and the engaging portions and extending along the sliding direction of the shutter member; and (d) projection portions formed on said two arms of said continuous plate portion, said projection portions extending at a right angle from said continuous plate portion to form generally L-shaped cross section and engaged to said second guide groove formed along one side of said first half, said continuous plate portion, said engaging portions and said projection portions operating together to hold and to prevent disengagement of said shutter member from said cartridge body.

2. A disc cartridge of an optical disc according to claim 1, wherein said second guide groove is formed adjacent said first guide groove in the first half.

* * * * *